United States Patent [19]

Knopka

[11] 4,045,513

[45] Aug. 30, 1977

[54] ETHYLENE 2,6-NAPHTHALENE DICARBOXYLATED-ALKYLENE-2,5 DIBROMOTEREPHTHALATE FLAME-RETARDANT COPOLYESTERS

[75] Inventor: William N. Knopka, Wilmington, Del.

[73] Assignee: Avtex Fibers Inc., Valley Forge, Pa.

[21] Appl. No.: 328,045

[22] Filed: Jan. 30, 1973

[51] Int. Cl.$^2$ .............................................. C08L 67/00
[52] U.S. Cl. ........................................ 260/860; 260/9; 260/16; 260/45.75 R; 260/75 H
[58] Field of Search ............. 260/860, 45.75 R, 75 H, 260/9, 16

[56] References Cited

U.S. PATENT DOCUMENTS

| 3,110,547 | 11/1963 | Emmert | 260/75 |
|---|---|---|---|
| 3,265,762 | 8/1966 | Quisenberry | 260/860 |
| 3,483,157 | 12/1969 | Smith et al. | 260/860 |
| 3,763,644 | 10/1973 | Jackson et al. | 260/75 |
| 3,775,374 | 11/1973 | Wolfe | 260/75 H |
| 3,794,617 | 2/1974 | Mains et al. | 260/47 |

OTHER PUBLICATIONS

Chem. Abst. 77:1972, 153086x, "Comparative--Sb$_2$O$_3$---Methods," Bower et al.
Polyesters-vol. I; Saturated Polymers, Ch. 5, pp. 114-115, Goodman and Rhys, TP-1180p$_6$G$_6$, [London, ILIFFE Books, Ltd.]Jan-1966.
Man-Made Fibers, vol. 3, pp. 24-43, Mark et al. (Editors), Interscience Publishers, Jan.-1970.

*Primary Examiner*—Edward M. Woodberry
*Attorney, Agent, or Firm*—Arthur R. Eglington

[57] ABSTRACT

A flame-retardant filament-forming copolyester resin of at least 75 mol % of ethylene-2,6-naphthalene dicarboxylate units and at least 5 mol % up to 25 mol % of alkylene-2,5-dibromoterephthalate units is disclosed herein. In addition, fibers of the above flame-retardant copolyester resin and flame-retardant cellulosic fibers are blended together to provide flame-retardant yarns and fabrics of excellent physical properties.

5 Claims, No Drawings

ETHYLENE 2,6-NAPHTHALENE DICARBOXYLATED-ALKYLENE-2,5 DIBROMOTEREPHTHALATE FLAME-RETARDANT COPOLYESTERS

It is known that polyester resins have a high carbon content and are quite flammable. They can be rendered flame-retardant by incorporating inorganic and organic materials therein, especially those containing bromine, chlorine, phosphorous, antimony, zinc and alumina. The main drawback of these systems is the adverse effects they have on fibers produced therefrom, since appreciable quantities of flame-retardant agents are required to promote the required level for flame-retardance. As a result, these materials can render the fiber brittle or, in other ways, affect the usually outstanding physical properties of the polyester. Another disadvantage to the additive approach is the fact that such additives can be easily leached out or removed during normal laundering and dry cleaning, causing an adverse effect on the flame-retardancy of the fabric.

An alternate method to improve the flame-retardancy of a polyester resin is the incorporation of a comonomer which contains one or more of the elements that are known to impart flame-retardancy. The major disadvantage of this approach is that the molar concentration of the comonomer, which is required to achieve the desired level of flame-retardance, is generally so high that the resultant resin manifests physical properties not usually associated with polyester. For example, a large proportion of comonomer would lower the melting point and, as a result, limit the utility of the polyester. Likewise, certain comonomers lower the crystallinity of the polymer, producing amorphous polymers which are incapable of producing commercially suitable textile fibers. If a flame-retardant copolyester could be produced with good physical and thermal properties, it would receive widespread acceptance for the manufacture of shaped articles.

The need for a polyester fiber which has good physical properties and high flame-retardancy is most critical for yarn and fabric blends of polyester fibers and cellulosic fibers. Polyester fibers are thermoplastic and when exposed to a flame, burn and melt away from the flame, thus extinguishing themselves. If polyester fibers are blended with flammable cellulosic fibers and exposed to a flame, the polyester is more likely to continue burning even when melting since the burning cellulose fiber continuously ignites it. If polyester fibers are blended with flame-retardant cellulosic fibers and the blend ignited, the flame-retardant cellulosic fibers burn only in the area of flame contact. However, the flame-retardant cellulosic fiber acts as a scaffold or support and prevents the polyester fiber from dripping or shrinking away from the flame, and the polyester continues to burn.

It is a primary object of this invention to provide a flame-retardant polyester resin suitable for the formation of fibers which will meet more stringent flame-retardant test requirements while maintaining good fiber physical properties.

It is another object of this invention to provide a flame-retardant fiber blend of a flame-retardant polyester fiber and a flame-retardant cellulose fiber which fiber blend has good physical properties.

It is still another object of this invention to provide fabrics having good permanent flame-retardancy and good physical properties which fabrics are prepared from polyester fibers and cellulosic fibers.

These and other objects are accomplished in accordance with this invention which comprises a filament-forming random copolyester resin of at least 75 Mol % of ethylene-2,6-naphthalene dicarboxylate units and at least 5 mol % up to 25 mol % of alkylene-2,5-dibromoterephthalate units wherein said alkylene radical has from 2 to 10 carbon atoms. The alkylene radical is derived from an alkylene glycol which can be structurally shown as $HO(CH_2)_nOH$ where $n$ is an integer of from 2 to 10.

The copolyester can contain up to 10 mol % of other interpolymerized ester units as is well known in this art to vary the properties of the resin as desired without deleteriously affecting the flame-retardant properties of the resin. Other ester units, which may be interpolymerized constituents of the copolyester chain in amounts up to 10 mol % are well known in the art and are usually derived from other diacids and diols. Some examples of these diacids and diols include terephthalic acid, isophthalic acid, bibenzoic acid, sulfoisophthalic acid, sulfoalkoxyisophthalic acid, diphenyl sulphone dicarboxylic acid, malonic acid, glutaric acid and the like; alkylene glycols having from 3 to 12 carbon atoms, gem-dialkyl glycols, bis(hydroxymethyl) cyclohexane, diethylene glycol and the like.

The copolyesters of this invention are preferably prepared by reacting (polycondensing) the 2,5-dibromoterephthalic acid with a low molecular weight prepolymer of ethylene 2,6-naphthalene dicarboxylate and an alkylene glycol having from 2 to 10 carbon atoms, preferably ethylene glycol. The reaction of the dialkyl ester of the brominated acid with the prepolymer is not recommended since its reactivity is severely limited. The dibromoterephthalic acid can also be used as an initial reactant in a direct esterification procedure with 2,6-naphthalene dicarboxylic acid and glycol.

The copolyester resins of this invention are those having an intrinsic viscosity of at least about 0.25, and preferably at least about 0.4 as determined in a 60 weight % phenol and 40 weight % tetrachloroethane solution at 30° C.

The copolyester resin described herein can have various additives incorporated therein to improve the resin properties. For example, heat, oxidation and ultra-violet light stabilizers, antistatic agents, plasticizers, dyes, pigments and the like can be employed.

Additionally, a metal compound from the group consisting of antimony oxides, e.g., antimony trioxide; antimony salts of α-hydroxycarboxylic or α,β-dicarboxylic acid (see Ger. Off. No. 2,121,186), zinc oxide, alumina and mixtures thereof can be mixed into the copolyester resin to provide additional improvement in flame-retardant properties. The metal compound is present in an amount such that the metal is present in an amount of from about 0.5 to about 5%, based on the weight of the resin.

While the resin of this invention can be formed into various shaped articles including filaments, bands, sheets and molded articles, it is especially useful when formed into textile fibers and yarns. These fibers are used, for example, to prepare flame-retardant clothing, carpets and draperies.

Fibers or filaments are usually formed by melt extrusion of the resin composition through a multihole spinneret in a conventional manner. The as-spun yarn is then conventionally oriented to produce textile yarn of the continuous filament or staple fiber type.

The most important embodiment of this invention comprises a mixture of fibers of the flame-retardant copolyester resin described above and flame-retardant cellulosic fibers, especially those having permanent flame-retardant properties. Mixtures or blends of these flame-retardant copolyester fibers and flame-retardant cellulosic fibers provide textile fabrics having the highly desirable wear characteristics of polyester textiles with the highly desirable comfort characteristics of cellulosic material.

Flame-retardant cellulosic fibers preferably include cotton, rayon or cellulose acetate fibers which have been combined, impregnated or coated with flame-retardant chemicals which provide substantially permanent flame-retardant properties therefor without degrading the physical properties of the fiber. That is, the cellulosic fibers or fabrics produced therefrom should be capable of withstanding periodic washing or cleaning with conventional dry cleaning solvents without losing much of their flame-retardant properties. Many flame-retardant treatments for cellulosic fibers are known and several have been found to produce substantially permanent flame-retardancy. It is preferred, in the case of artificially prepared cellulosic fibers such as rayon and cellulose acetate, that the flame-retardant chemical be incorporated into the cellulosic spinning solution thereby providing cellulosic fibers having the flame-retardant "locked in" the cellulosic matrix. Examples of the preparation of these types of cellulosic fibers are found in U.S. Pat. No. 2,816,004, 3,266,918, 3,321,330, 3,455,713, 3,645,936 and 3,704,144.

One preferred form of this invention involves the use of the flame-retardant regenerated cellulose filaments or fibers described in U.S. Pat. No. 3,455,713. These fibers have been found to have excellent physical properties and permanent flame-retardancy. In brief, they are regenerated cellulose filaments having dispersed therein a substantially water-insoluble, liquid phosphonitrilate polymer having the general formula:

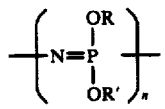

wherein R and R' are the same or different alkyl or alkenyl radicals having from one to six carbon atoms and $n$ is an integer of at least three.

These filaments are preferably prepared by incorporating a flame-retarding amount of the phosphonitrilate polymer in filament-forming viscose, and spinning and regenerating filaments.

In another aspect of the invention, the flame-retardant cellulosic fibers are cellulose acetate fibers prepared by incorporating compounds such as tris-(2,3-dibromopropyl) phosphate or similar compounds as disclosed in U.S. Pat. No. 3,321,330 into the acetate spinning dope and wet or dry spinning the fibers.

In general, fiber blends of this invention will contain from about 10 to 90, preferably 20 to 80 weight percent polyester fibers and 90 to 10, preferably 80 to 20 weight percent of cellulosic fibers.

The blended or combined flame-retardant polyester and cellulosic fibers are used in various fiber and fabric constructions including, for example, spun staple yarns, mixed or tangled continuous filament yarns, novelty yarns, knit, woven and non-woven fabrics.

The flame-retardant polyester fibers described herein can also be blended with or combined in a fabric with normally flame-retardant fibers including, for example, glass fibers, polyvinyl chloride fibers, asbestos fibers, metal fibers, modacrylic fibers such as those having the trademark Dynel and Verel, and aromatic ring polyamide fibers such as that having the trademark Nomex. Fiber and fabric blends can, of course, comprise more than one of the other known flame-retardant fibers with the flame-retardant polyester fibers of this invention.

It is realized that blends of polyester fibers and cellulosic fibers have been treated, usually in the form of a fabric, with flame-retardant chemicals to provide flame-retardant material. However, this approach does not usually provide fabrics which will retain their flame-retardant properties after many washings or dry cleaning treatments. Furthermore, such aftertreatments tend to stiffen the fabrics to an undesirable extent.

The following examples are set forth to demonstrate this invention.

EXAMPLE I 2,5-dibromoterephthalic acid was prepared in accordance with the procedure described in British Specification No. 946,259 except that the brominated terephthalic acid was not esterified but recrystallized from glacial acetic acid.

Filament-forming random copolymer resins containing varied amounts of bromine with or without antimony were prepared by reacting 2,5-dibromoterephthalic acid with bis(2-hydroxyethyl)-2,6-naphthalene dicarboxylate under conventional polycondensation conditions. Varying amounts of antimony trioxide were incorporated with the reactants to obtain the desired antimony content. In a similar manner, various filament-forming random copolymer resins of 2,5-dibromoterephthalic acid and bis(2-hydroxyethyl) terephthalate were prepared.

The copolyester resins were first evaluated for flame-retardancy by grinding the resin sufficiently for the resulting particulate to pass through a 10 mesh screen and pressed into plaques 1/32 × 5 ¼ × 5 ¼ inches. The plaques were prepared as follows: A chrome plated brass plate is placed in a Carver Press; a sheet of 6 ¼ × 6 ¼ inches Teflon coated aluminum foil is placed on the brass plate, followed by a 6 × 6 × 1/32 inches spacer with inside dimensions of 5 ¼ × 5 ¼ inches. A 6 gram sample of the polymer to be evaluated is spread evenly inside the spacer. Next, a 5 ¼ × 5 ¼ inches square of fiberglass fabric is placed on the resin powder. Another 6 grams of resin is spread on the top surface of the fiberglass, followed by another sheet of Teflon coated foil and a second chrome plated brass plate. The press platens (previously heated at 270° C.) are slowly closed to the point where they just begin to touch the top chrome plate. After 3 minutes, the platens are tightly closed and the pressure raised to 10,000–12,000 p.s.i.g. After 1 minute, the pressure was released and the laminate quenched in a cold bath. The resultant plaques were cut into ¼ × 5 ¼ inches strips and evaluated in the Standard Method of Test for Flammability of Plastics Using the Oxygen Index Method, ASTM-D-2863-70, commonly called the LOI test. The higher the LOI number the better the flame-retardant property of the resin.

The results of the LOI test on various plaques of resins prepared as described above are set forth in the following table. The designation PET-DBT in the following table indicates a filament-forming copolyester of ethylene terephthalate units and ethylene-2,5-dibromoterephthalate units and the designation PEN-DBT indicates a filament-forming copolyester of ethylene 2,6-naphthalene dicarboxylate units and ethylene-2,5-dibromoterephthalate units as described for this invention.

Table I

| Resin | Br.,%* | Sb.,%** | LOI Number |
|---|---|---|---|
| (1) PET-DBT | 5.22 | — | 22.4 |
| (2) PET-DBT | 9.81 | — | 26.7 |
| (3) PEN-DBT | 4.69 | — | 30.5 |
| (4) PET-DBT | 5.13 | 0.94 | 26.3 |
| (5) PEN-DBT | 4.55 | 0.50 | 35.2 |
| (6) PET-DBT | 9.41 | 1.00 | 30.0 |
| (7) PEN-DBT | 9.88 | 0.60 | 44.0 |
| (8) PET-DBT | 13.90 | 1.06 | 36.0 |

*Percent bromine (from brominated comonomer) based on the weight of the resin composition.
**Percent antimony (from antimony trioxide) based on the weight of the resin composition.

It can be seen from the results in the above table that the copolyester resins of this invention have much greater flame-retardant effectiveness that similar copolyesters of ethylene terephthalate and ethylene-2,5-dibromoterephthalate.

EXAMPLE II

Copolyesters of ethylene-2,6-naphthalene dicarboxylate units and ethylene-2,5-dibromoterephthalate units in various mol ratios with and without antimony were prepared using the following general procedure.

A reaction vessel, equipped with a nitrogen inlet, heating means and stirring means, was charged with 498.44 grams (2.0 moles) of dimethyl-2,6-naphthalene dicarboxylate, 260.4 grams (4.2 moles) of ethylene glycol and 0.1147 grams of manganous acetate (0.04 mol % based on the moles of the dicarboxylate). The mixture was slowly heated under a nitrogen atmosphere to 165° C. over 45 minutes, at which time the first drop of distillate was observed; after an additional 33.0 minutes, the reaction temperature had reached 193° C., at which time 50% of the theoretical methyl alcohol had been collected. Heating was continued at 193°–221° C. for 90 minutes, followed by a final period of 70 minutes at 221°–225° C. After cooling, the reaction equipment was dismantled, giving 611.4 grams of white prepolymer. This was used without further purification in the next step.

One hundred thirty-seven and three-tenths grams of the above prepolymer, 12.7 grams of 2,5-dibromoterephthalic acid, 0.039 gram of $Sb_2O_3$ and 0.594 gram of triphenyl phosphite were charged into a reaction vessel. The mixture was heated to 225° C. in 40 minutes under a nitrogen atmosphere. The temperature was raised from 225° C. to 275° C. in 65 minutes while lowering the pressure to 0.6 mm. of mercury. After 90 minutes, the polycondensation was finished, giving the copolyester resin. The resulting resin was spun into a 10 filament yarn through a spinneret affixed to the reactor bottom and the yarn was uniformly oriented by drawing at a temperature of 149° C. and at a 5.025:1 draw ratio.

This oriented polyester yarn was then combined in a conventional manner with a permanent flame-retardant rayon to provide a 50/50 blended yarn. The rayon was prepared in accordance with U.S. Pat. No. 3,455,713 and contained about 15% by weight of a water-insoluble, liquid polymer of di-n-propyl phosphonitrilate. The resulting yarn blend was knit on a Lawson knitting machine into a sleeve weighing 4.93 oz. per square yard. The blended fabric was evaluated in a vertical flammability test as defined by the United States Department of Commerce FF 3-71 (37 F.R. 146,424), "Standard for the Flammability of Children's Sleepwear." The test results are shown in Table II.

Table II

| Vertical Flammability Test (3 second bone dry) |
|---|
| 5 samples, NAF[1], 2.11" CL[2] |

[1]NAF = "no after flame", meaning material self-extinguishing when flame source was removed
[2]CL = "char length"

An analysis of the copolyester fiber produced in this example revealed the presence of 4.58% bromine, an intrinsic viscosity of 0.36, a free carboxyl content of 13 meq./kg., a glass transition temperature of 76° C., and a crystalline melting point of 246° C. These data clearly show that the copolyester resins of this invention, as shown in Example I, would also pass the vertical flame test if they had been spun into fibers.

EXAMPLE III

In a manner similar to that described in Example II, 29.2 grams of 2,5-dibromoterephthalate acid was added to 150 grams of prepolymer (previously prepared by reacting 2.1 moles of ethylene glycol with 1.0 mole of dimethyl terephthalate in the presence of calcium acetate; 0.92% methoxyl; 7.31% free ethylene glycol; 6 meq./gram, free carboxyl; 1.18% diethylene glycol content). The polycondensation was catalyzed by 0.12 grams of antimony trioxide.

The temperature was raised from 200° C. to 250° C. in 2 hours, while lowering the pressure to 0.6 mm. of mercury. After 210 minutes, the polycondensation was finished giving the copolyester resin. The resulting resin was spun into a 10 filament yarn through a spinneret affixed to the reactor bottom. The yarn was uniformly oriented by drawing at a temperature of 121° C. and at a 3.36:1 draw ratio. After drawing, it was combined in a conventional manner with the flame-retardant rayon described in Example II to provide a 50/50 yarn blend. This yarn was knit on a Lawson knitter and weighed 6.95 oz. per square yard. The fabric blend was evaluated in the vertical flame test in the same manner as described in Example II. The test results are shown in the following table.

Table III

| Vertical Flammability Test (3 second bone dry) | |
|---|---|
| Burn | |
| (1) | 2.0 sec. AF[1] - 3.06" CL[2] |
| (2) | 2.0 sec. AF - 3.19" CL |
| (3) | 1.0 sec. AF - 3.06" CL |
| (4) | 11.0 sec. AF - 3.56" CL |
| (5) | 2.0 sec. AF - 3.31" Cl |

[1]AF = after flame; material continued to burn for the period shown after the flame was removed
[2]CL = char length; original sleeve length was 10 inches An analysis of the polyester fiber of this example before blending revealed that it contained 9.49 weight % bromine, had an intrinsic viscosity of 0.49, a free carboxyl content of 13 meq./kg. and contained 0.4% of diethylene glycol. These data show that in spite of the increased quantity of bromine in the ethylene terephthalate copolymer, the copolyester containing ethylene, 2,6-naphthalene dicarboxylate units is clearly superior. Copolyesters containing ethylene terephthalate units manifest longer periods of burning after the flame is removed causing 50% longer char lengths. The effect of the relatively small amount of bromine plus the synergistic influence of the 2,6-naphthalene dicarboxylate units on the flame-retardancy is quite unexpected.

EXAMPLE IV

To a stainless steel polymerization reactor equipped with stirring and heating means was added 33 pounds of dimethyl terephthalate, 22 pounds of ethylene glycol and 22.1 grams of calcium acetate. After heating for 4 hours at 20°-225° C., the transesterification sequence had been completed. At this point, 4.5 pounds of 2,5-dibromoterephthalic acid and 15.7 grams of antimony trioxide were added to the mixture. Heating and stirring were continued for an additional hour. The pressure was gradually lowered over 75 minutes to 1.0-1.4 mm. of mercury, while the temperature was simultaneously increased to 250° C. After about 3 hours and 15 minutes, the polycondensation was terminated. The resultant resin was extruded onto a moving belt and thence diced into small chips.

The resin was yellow in color; it had an intrinsic viscosity of 0.42; free carboxyl, 16 meq. per gram; contained 5.76% bromine; melted at 222° C. The resin was melt spun in the conventional manner to give a 34 filament yarn. The samples could not be drawn using a heated pin (93° C.), thus cold drawing was necessary. Occasional splits occurred during the drawing. The physical properties as shown in Table IV are averages obtained from several trials.

Table IV summarizes the physical properties obtained from the polyester yarns prepared in Examples II, III and IV. The yarns were processed in each case to obtain the best physical properties.

Table IV

| Example | Bromine (%) | Tenacity (g./d.) | Elongation (%) |
|---|---|---|---|
| PET[1] Control | 0 | 3.4 | 39.2 |
| PEN[2] Control | 0 | 5.1 | 34.8 |
| II (PEN-DBT) | 4.58 | 4.0 | 34.6 |
| III (PET-DBT) | 9.49 | 2.1 | 55.7 |
| IV (PET-DBT) | 5.76 | 2.4 | 16.6 |

[1]PET = poly(ethylene terephthalate)
[2]PEN = poly(ethylene-2,6-naphthalene dicarboxylate)

The data in Table IV indicates that polyester fibers, obtained from the copolymerization of 2,5-dibromoterephthalate acid with naphthalene-2,6-dicarboxylic acid and ethylene glycol are unexpectedly superior in physical properties to those obtained from the corresponding copolymer of terephthalic acid and at the same time meet stringent flame-retardant standards. The results shown for the fibers of Example III indicate that yarn blends containing yarns prepared from copolyesters of terephthalic acid and 2,5-dibromoterephthalic acid, although sufficient to impart flame-retardance are physically weaker and as a result will not give the outstanding wear performance typically associated with the non-flame-retardant blend.

Various changes and modifications may be made in practicing the invention without departing from the spirit and scope thereof and, therefore, the invention is not to be limited except as defined in the appended claims.

I claim:

1. A filament-forming random copolyester resin of at least 75 mol % of ethylene-2,6-naphthalene dicarboxylate units and at least 5 mol % up to 25 mol % of alkylene-2,5-dibromoterephthalate units wherein the alkylene radical has from 2 to 10 carbon atoms.

2. The copolyester resin of claim 1 wherein the alkylene radical is ethylene.

3. The copolyester resin of claim 1 having dispersed therein a metal compound selected from the group consisting of antimony oxides, antimony salts of α-hydroxycarboxylic or α,β-dicarboxylic acid, zinc oxide and alumina such that the metal is present in an amount of from 0.5 to 5% based on the weight of the resin.

4. The copolyester resin of claim 1 in the form of a shaped article.

5. The copolyester resin shaped article of claim 4 in the form of textile fibers.

* * * * *